United States Patent    (10) Patent No.: US 11,096,129 B2
Wigard et al.    (45) Date of Patent: Aug. 17, 2021

(54) METHOD AND SIGNALING FOR OPTIMIZED CELL SWITCH IN EARTH FIXED CELLS NTN CONFIGURATION

(71) Applicant: NOKIA TECHNOLOGIES OY, Espoo (FI)

(72) Inventors: Jeroen Wigard, Klarup (DK); Rafhael Amorim, Aalborg (DK); Istvan Z. Kovacs, Aalborg (DK); Matthew Baker, Cambridge (GB); Mads Lauridsen, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/555,617

(22) Filed: Aug. 29, 2019

(65) Prior Publication Data
US 2021/0068065 A1    Mar. 4, 2021

(51) Int. Cl.
 *H04W 4/00*    (2018.01)
 *H04W 56/00*    (2009.01)
 *H04W 74/08*    (2009.01)

(52) U.S. Cl.
 CPC ..... *H04W 56/0005* (2013.01); *H04W 56/003* (2013.01); *H04W 56/004* (2013.01); *H04W 74/0833* (2013.01)

(58) Field of Classification Search
 CPC ....... H04B 7/2662; H04B 7/2687; H04J 3/06; H04J 2011/0096; H04J 2013/0096; H04J 7/00; H04J 7/10; H04L 27/2655; H04W 36/0058; H04W 36/0061; H04W 36/08; H04W 56/00; H04W 56/0005; H04W 56/001; H04W 56/004; H04W 74/0833; H04W 56/003
See application file for complete search history.

(56) References Cited

U.S. PATENT DOCUMENTS

2018/0351802 A1* 12/2018 Dutti .................. H04L 41/0816
2019/0313357 A1* 10/2019 Wang .................... H04W 76/10
2019/0342845 A1* 11/2019 Laselva ............. H04W 56/0045
2019/0394770 A1* 12/2019 Wang .................... H04W 76/28
2020/0145977 A1*  5/2020 Kumar ...................... G01S 5/12
2020/0153500 A1*  5/2020 Kim ....................... H04W 36/14
2020/0178135 A1*  6/2020 Yun ........................ H04W 36/08
2020/0305188 A1*  9/2020 Liu ................... H04W 56/0045

(Continued)

OTHER PUBLICATIONS

Kim et al, Preliminary document of 5G-ALLSTAR architecture, API and interface specifications, Deliverable D2.2, 5GALLSTAR, 74 pages, Apr. 30, 2019.*

(Continued)

*Primary Examiner* — Frank Duong
(74) *Attorney, Agent, or Firm* — Squire Patton Boggs (US) LLP

(57) ABSTRACT

Certain embodiments may relate to wireless communication systems. For example, some embodiments may relate to non-terrestrial networks (NTN). A method, in certain embodiments, may include receiving, by a user equipment (UE), at least one resynchronization message from at least one first network entity (NE). The method may also include resynchronizing, by the UE, with at least one second NE after at least one time period with at least one parameter based upon the at least one resynchronization message.

20 Claims, 7 Drawing Sheets

(56) References Cited

U.S. PATENT DOCUMENTS

2020/0313755 A1* 10/2020 Chuang ................ H04L 5/0048
2020/0351957 A1* 11/2020 Kim .................... H04L 27/2665
2021/0006328 A1*  1/2021 Kim .................... H04L 1/1819
2021/0029658 A1*  1/2021 Mahalingam ..... H04W 56/0005

OTHER PUBLICATIONS

Saamisaari et al, 5G NR over Satellite Links: Evaluation of Synchronization and Random Access Processes, IEEE, 4 pages, 2019.*
Nokia, Nokia Shanghai Bell, Positioning in NTN, 3GPP TSG-RAN WG1 #96, R1-1901721,5 pages, Mar. 2019.*
3GPP TR 38.811 V15.1.0 (Jun. 2019); 3rd Generation Partnership Project; Technical Specification Group Radio Access Network; Study on New Radio (NR) to support non-terrestrial networks (Release 15), 126 pages.
3GPP TR 38.821 V0.7.0 (May 2019); 3rd Generation Partnership Project; Technical Specification Group Radio Access Network; Solutions for NR to support non-terrestrial networks (NTN) (Release 16), 86 pages.

* cited by examiner

FIG. 1

| Scenarios | GEO based non-terrestrial access network (Scenario A and B) | LEO based non-terrestrial access network (Scenario C & D) |
|---|---|---|
| Altitude | 35,786 km | 600 km<br>1,200 km |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 541.14 ms (service and feeder links)<br>Scenario B: 271.57ms (service link only) | Scenario C: (transparent payload: service and feeder links)<br>• 25.76ms(600km)<br>• 41.75ms(1200km)<br><br>Scenario D: (regenerative payload: service link only)<br>• 12.88ms(600km)<br>• 20.87ms(1200km) |

FIG. 6

601 — transmitting, by a network entity (NE), at least one resynchronization message to at least one user equipment (UE)

METHOD AND SIGNALING FOR OPTIMIZED CELL SWITCH IN EARTH FIXED CELLS NTN CONFIGURATION

BACKGROUND

Field

Certain embodiments may relate to wireless communication systems. For example, some embodiments may relate to non-terrestrial networks (NTN).

Description of the Related Art

As part of 3rd Generation Partnership Project (3GPP) release (Rel)-15, non-terrestrial networks are considered in various deployment scenarios covering different satellite altitudes. In general, satellites may be deployed in a geostationary earth orbit (GEO) or low earth orbit (LEO). Some differences between GEO and LEO deployments are summarized in the table shown in FIG. 1, as in 3GPP technical report (TR) 38.821.

SUMMARY

In accordance with some embodiments, a method may include receiving, by a user equipment (UE), at least one resynchronization message from at least one network entity (NE). The method may further include resynchronizing, by the UE, after $t_2$ with at least one parameter based upon the at least one resynchronization message.

In accordance with some embodiments, an apparatus may include means for receiving at least one resynchronization message from at least one network entity (NE). The apparatus may further include means for resynchronizing after $t_2$ with at least one parameter based upon the at least one resynchronization message.

In accordance with some embodiments, an apparatus may include at least one processor and at least one memory including computer program code. The at least one memory and the computer program code may be configured to, with the at least one processor, cause the apparatus to at least receive at least one resynchronization message from at least one network entity (NE). The at least one memory and the computer program code may be further configured to, with the at least one processor, cause the apparatus to at least further resynchronize after $t_2$ with at least one parameter based upon the at least one resynchronization message.

In accordance with some embodiments, a non-transitory computer readable medium may be encoded with instructions that may, when executed in hardware, perform a method. The method may receive at least one resynchronization message from at least one network entity (NE). The method may further resynchronize after $t_2$ with at least one parameter based upon the at least one resynchronization message.

In accordance with some embodiments, a computer program product may perform a method. The method may receive at least one resynchronization message from at least one network entity (NE). The method may further resynchronize after $t_2$ with at least one parameter based upon the at least one resynchronization message.

In accordance with some embodiments, an apparatus may include circuitry configured to receive at least one resynchronization message from at least one network entity (NE). The circuitry may further resynchronize after $t_2$ with at least one parameter based upon the at least one resynchronization message.

In accordance with some embodiments, a method may include transmitting, by a network entity (NE), at least one resynchronization message to at least one user equipment (UE).

In accordance with some embodiments, an apparatus may include means for transmitting at least one resynchronization message to at least one user equipment (UE).

In accordance with some embodiments, an apparatus may include at least one processor and at least one memory including computer program code. The at least one memory and the computer program code may be configured to, with the at least one processor, cause the apparatus to at least transmit at least one resynchronization message to at least one user equipment (UE).

In accordance with some embodiments, a non-transitory computer readable medium may be encoded with instructions that may, when executed in hardware, perform a method. The method may transmit at least one resynchronization message to at least one user equipment (UE).

In accordance with some embodiments, a computer program product may perform a method. The method may transmit at least one resynchronization message to at least one user equipment (UE).

In accordance with some embodiments, an apparatus may include circuitry configured to transmit at least one resynchronization message to at least one user equipment (UE).

BRIEF DESCRIPTION OF THE DRAWINGS

For proper understanding of the invention, reference should be made to the accompanying drawings, wherein:

FIG. 1 illustrates an example of a table describing NTN scenario satellite-earth distance and round trip time in GEO and LEO deployments.

FIG. 6 illustrates an example of a method performed by a NE according to certain embodiments.

DETAILED DESCRIPTION

Figure 2:
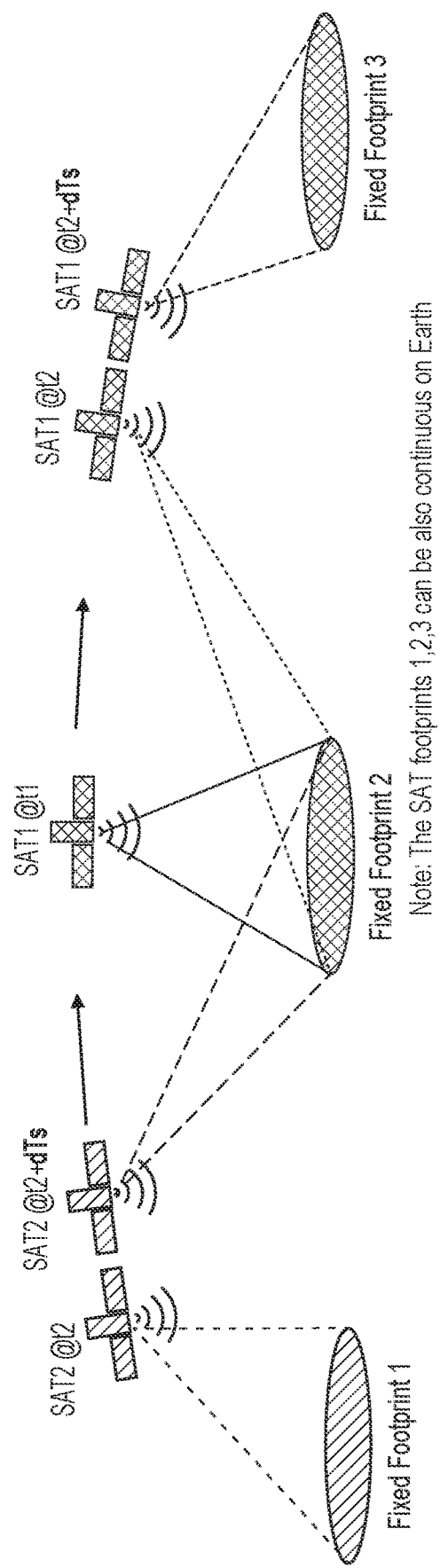
FIG. 2 illustrates an example of connections between fixed cells, earth-based cells, and various switching points.

LEO satellites move at a relatively high speed, for example, 8 km/s, which may impact its mobility and interaction with earth-based cells. For example, for fixed cells on earth, satellites may generate steerable satellite beams, where the direction of the beam (i.e., max gain) may be dynamically adjusted with respect to the orbit of the satellite in order for its footprint to remain stationary on Earth, as illustrated in FIG. 2. A new radio (NR) cell formed by one or more satellite beams may have radio coverage stationary on Earth. Over time, the satellite may become unable to steer the beam to the same location, and a second satellite may assume transmission by providing the same cell for the same coverage area, which may be with same physical cell identifier (PCI). This may provide the benefit of simplifying the region and management of tracking areas. However, this consecutive coverage by multiple satellites on the same orbit requires periodic and frequent satellite beam switching so that continuous service may be provided to the same geographical area. In this way, the satellite beam may be steered and resynchronized since the Doppler frequency and timing advance values may vary.

Figure 3:
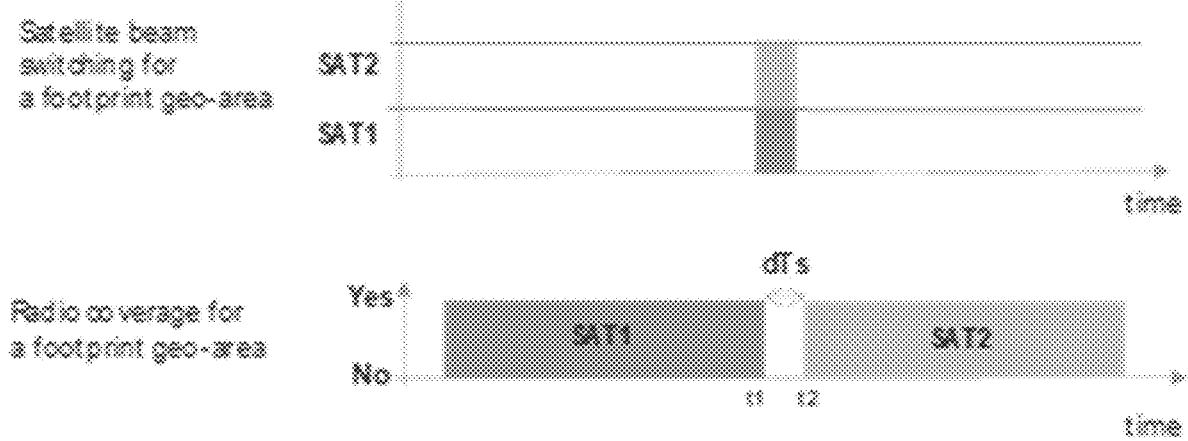
FIG. 3 illustrates an example of beam switching with corresponding timings according to certain embodiments.

As illustrated in FIG. 3, mobile cells on earth may generate satellite beams which do not change their pointing direction (max gain) with respect to the orbit of the satellite since their footprint is moving on earth. In addition, a NR cell formed by at least one satellite beam may have a radio coverage moving on earth, simplifying the radio frequency (RF) and base band (BB) implementation on the satellite. However, such mobile cells rely on pre-determined and/or semi-statically configured satellite beam parameters.

Existing techniques may experience radio link failure (RLF) during the gNB switch in a NTN with LEO fixed cell on earth. The RLF may be due to the loss of synchronization experienced by the user since the PCI radio transmitter may be transferred between satellites. In addition to the timing advance synchronization, the radio link may also be affected by factors including sudden variations in the Doppler effect, interruption time being above certain levels, and loss of beam association, for example, due to directivity of UE receiver/transmitter, if available.

Certain embodiments may result in improvements in computer-related technology. For example, various embodiments may minimize any impact of the coverage gap (dTs) introduced due to satellite/gNB switch, and may avoid the need to reset MAC configurations. Furthermore, some embodiments may avoid unnecessary radio and signalling procedures triggered by RLF/history-based offloading framework (HOF) conditions, as well as avoid HARQ processes of being flushed, and may continue with the retransmissions after the interruption time. Additionally, certain embodiments may enable—UE service continuity with reduced initial access signalling required in the new gNB, thereby reducing power consumption of user equipment. Finally, several embodiments may allow simple granular control.

Figure 4:
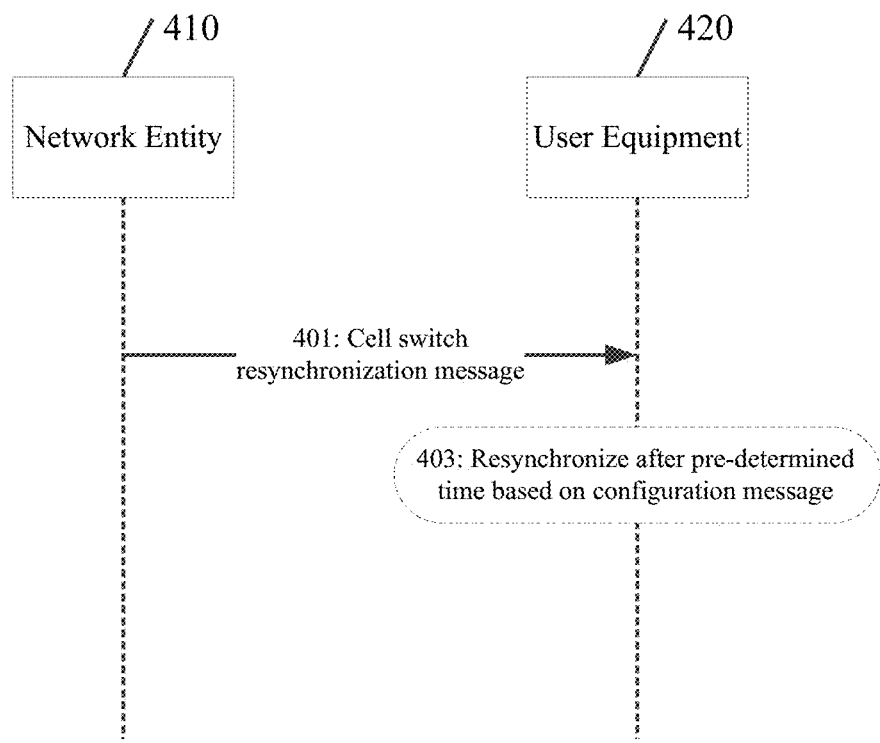
FIG. 4 illustrates a signaling diagram according to certain embodiments.

FIG. 4 illustrates a signaling diagram according to some embodiments. In step 401, NE 410, which may be similar to NE 710 in FIG. 7, may transmit at least one resynchronization message to UE 420, which may be similar to UE 720 in FIG. 7. The at least one resynchronization message may be configured for UE-specific signaling, group-specific signaling, and/or cell-specific signaling. For example, at least one of the modes may be associated with at least one scenario and/or at least one time of day, and/or may be used in different combinations based upon one or more of at least one number of and at least one type of UE, such as UE 410. Additionally, if the number of UE associated with NE 410 is below at least one pre-defined threshold, the at least one resynchronization message may comprise UE-specific signaling. In another example, group-specific signaling may be used for local hotspots, such as cruise ships.

The at least one resynchronization message may be signaled via at least one radio resource control (RRC) signaling channel and/or may comprise at least one random access control parameter. In certain embodiments, the at least one resynchronization message may comprise one or more of at least one beam switching duration (dTs) indication, at least one start time ($t_1$), at least one timing advance, at least one Doppler indicator, at least one three-dimensional angle, and at least one transmission power value. Additionally or alternatively, the at least one resynchronization message may be UE-specific to provide an optimal time distribution of reconnections of UE 420 to NE 410. Furthermore, the at least one resynchronization message may comprise at least one value which is group-specific value and/or cell-specific, both as described below. The at least one resynchronization message may comprise at least one UE-specific value which is a delta value relative to the group-specific and/or cell-specific value.

In various embodiments, the at least one resynchronization message may comprise one or more of at least one common TA value, at least one differential TA value, and at least one absolute TA value, any of which may be associated with $t_2$ of NE 410. For example, at least one TA value may be based upon UE 420 location information, for example, GNSS-based and/or network-based; at least one current TA value associated with NE 410; and/or any current or subsequent satellite ephemeris (trajectory) data.

In some embodiments, the at least one resynchronization message may comprise information associated with one or more of at least one common Doppler shift value at $t_2$, at least one differential Doppler shift value at $t_2$; and at least one absolute Doppler shift value at $t_2$ of NE 410. For example, such information may be determined based upon one or more of the location of NE 410, at least one current TA value, and satellite ephemeris data.

In certain embodiments, the at least one resynchronization message may comprise information of at least one 3D angle of $t_2$ of NE 410. For example, such information may comprise location information of NE 410 and/or satellite ephemeris data. Furthermore, having access to the ephemeris data, UE 420 may determine this information based upon at least one identifier of NE 410. Additionally or alternatively, the at least one resynchronization message may comprise information associated with transmission power of NE 410. For example, the information may comprise the transmission power directly in case of a regenerative satellite, and may comprise a gain factor, transmission power, and/or feeder link loss associated with at least one transparent satellite.

The at least one resynchronization message may be associated with UE group-casting configured to provide of at least one TA value to a group of UEs, including UE 420, of at least one cell switch. In certain embodiments, the at least one resynchronization message may comprise one or more of at least one dTs indication, at least one start time ($t_1$), at least one timing advance, at least one Doppler indicator, at least one three-dimensional angle, and at least one transmission power value. Additionally or alternatively, the at least one resynchronization message may be UE group-specific configured to indicate at least one delta value relative to the cell-specific value.

In various embodiments, the at least one resynchronization message may comprise information indicating at least one change in the common TA value and/or average TA value for the group; and/or at least one new TA value associated with the group. For example, this information may be configured to enable UE 420 to have a first estimate, thus, provide faster synchronize to NE 410.

In some embodiments, the at least one resynchronization message may comprise information associated with the change in at least one common Doppler shift value and/or at least one average Doppler shift value associated with the group; and/or at least one new Doppler value associated with the group. In certain embodiments, the at least one resynchronization message may comprise information of at least one 3D angle of $t_2$ of NE 410. For example, such information may comprise location information of NE 410 and/or satellite ephemeris data. Furthermore, having access to the ephemeris data, UE 420 may determine this information based upon at least one identifier of NE 410.

Additionally or alternatively, the at least one resynchronization message may comprise information associated with transmission power of NE 410. For example, the transmission power may be directly in case of a regenerative satellite and/or gain factor, transmission power, and/or feeder link loss associated with at least one transparent satellite.

In some embodiments, the at least one resynchronization message may be associated with at each UE, including UE 410, associated with at least one cell. Such information may reduce signaling overhead.

In various embodiments, the at least one resynchronization message may comprise at least one last frame number to be transmitted before the interruption time and/or the interruption time, allow at least one timer of UE 420 to modify at least one process in at least one medium access control (MAC)/physical (PHY) layer, for example, semi-persistent schedulers and/or feedback.

Figure 7:
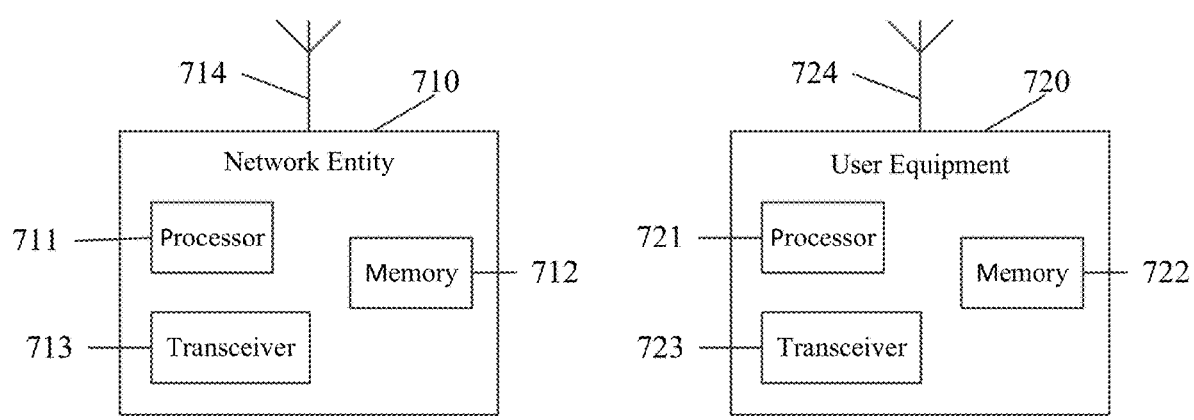
FIG. 7 illustrates an example of a system according to certain embodiments.

In step 403, UE 420 may resynchronize with a second NE (not shown), which may be similar to NE 710 in FIG. 7, after $t_2$ with at least one parameter based upon the at least one resynchronization message, resulting in faster synchronization compared to techniques of UE 420 detecting and reporting at least one RLF. In addition, at least one timer of UE 420 may be suspended and/or incremented by a time equal to the interruption time.

Figure 5:
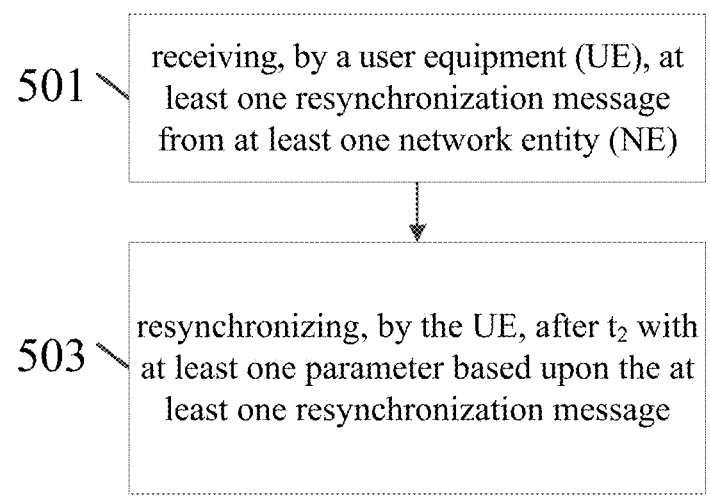
FIG. 5 illustrates an example of a method performed by a UE according to certain embodiments.

FIG. 5 illustrates an example of a method performed by a UE, such as UE 720 illustrated in FIG. 7, according to certain embodiments. In step 501, the UE may receive at least one resynchronization message from a first NE, which may be similar to NE 710 in FIG. 7. The at least one resynchronization message may be configured for UE-specific signaling, group-specific signaling, and/or cell-specific signaling. For example, at least one of the modes may be associated with at least one scenario and/or at least one time of day, and/or may be used in different combinations based upon one or more of at least one number of and at least one type of UE. Additionally, if the number of UE associated with the NE is below at least one pre-defined threshold, the at least one resynchronization message may comprise UE-specific signaling. In another example, group-specific signaling may be used for local hotspots, such as cruise ships.

The at least one resynchronization message may be signaled via at least one radio resource control (RRC) signaling channel and/or may comprise at least one random access control parameter. In certain embodiments, the at least one resynchronization message may comprise one or more of at least one dTs indication, at least one start time ($t_1$), at least one timing advance, at least one Doppler indicator, at least one three-dimensional angle, and at least one transmission power value. Additionally or alternatively, the at least one resynchronization message may be UE-specific to provide an optimal time distribution of reconnections of the UE 420 to the NE. Furthermore, the at least one resynchronization message may comprise at least one value which is group-specific value and/or cell-specific, both as described below. The at least one resynchronization message may comprise at least one UE-specific value which is a delta value relative to the group-specific and/or cell-specific value.

In various embodiments, the at least one resynchronization message may comprise one or more of at least one common TA value, at least one differential TA value, and at least one absolute TA value, any of which may be associated with $t_2$ of the NE. For example, at least one TA value may be based upon the UE location information, for example, GNSS-based and/or network-based; at least one current TA value associated with the NE; and/or any current or subsequent satellite ephemeris (trajectory) data.

In some embodiments, the at least one resynchronization message may comprise information associated with one or more of at least one common Doppler shift value at $t_2$, at least one differential Doppler shift value at $t_2$; and at least one absolute Doppler shift value at $t_2$ of the NE. For example, such information may be determined based upon one or more of the location of the NE, at least one current TA value, and satellite ephemeris data.

In certain embodiments, the at least one resynchronization message may comprise information of at least one 3D angle of $t_2$ of the NE. For example, such information may comprise location information of the NE and/or satellite ephemeris data. Furthermore, having access to the ephemeris data, the UE may determine this information based upon at least one identifier of the NE. Additionally or alternatively, the at least one resynchronization message may comprise information associated with transmission power of the NE. For example, the transmission power may be directly in case of a regenerative satellite and/or gain factor, transmission power, and/or feeder link loss associated with at least one transparent satellite.

The at least one resynchronization message may be associated with group-casting configured to provide at least one indication of at least one TA value to a group of UEs, including the UE, of at least one cell switch. In certain embodiments, the at least one resynchronization message may comprise one or more of at least one dTs indication, at least one start time ($t_1$), at least one timing advance, at least one Doppler indicator, at least one three-dimensional angle, and at least one transmission power value. Additionally or alternatively, the at least one resynchronization message may be UE group-specific configured to indicate at least one delta value relative to the cell-specific value.

In various embodiments, the at least one resynchronization message may comprise information indicating at least one change in the common TA value and/or average TA value for the group; and/or at least one new TA value associated with the group. For example, this information may be configured to enable the UE to have a first estimate, thus, provide faster synchronize to the NE.

In some embodiments, the at least one resynchronization message may comprise information associated with the change in at least one common Doppler shift value and/or at least one average Doppler shift value associated with the group; and/or at least one new Doppler value associated with the group. In certain embodiments, the at least one resynchronization message may comprise information of at least one 3D angle of $t_2$ of the NE. For example, such information may comprise location information of the NE and/or satellite ephemeris data. Furthermore, having access to the ephemeris data, the UE may determine this information based upon at least one identifier of the NE.

Additionally or alternatively, the at least one resynchronization message may comprise information associated with transmission power of the NE. For example, the transmission power may be directly in case of a regenerative satellite and/or gain factor, transmission power, and/or feeder link loss associated with at least one transparent satellite.

In some embodiments, the at least one resynchronization message may be associated with at each UE, including the UE, associated with at least one cell. Such information may reduce signaling overhead.

In various embodiments, the at least one resynchronization message may comprise at least one last frame number to be transmitted before the interruption time and/or the interruption time, allow at least one timer of the UE to modify at least one process in at least one MAC/PHY layer, for example, semi-persistent schedulers and/or feedback.

In step 503, the UE may resynchronize with a second NE, which may be similar to NE 710 in FIG. 7, after $t_2$ with at least one parameter based upon the at least one resynchronization message, resulting in faster synchronization compared to techniques of the UE detecting and reporting at least one RLF. In addition, at least one timer of the UE may be suspended and/or incremented by a time equal to the interruption time.

FIG. 6 illustrates an example of a method performed by a NE, such as NE 710 illustrated in FIG. 7, according to certain embodiments. In step 601, the NE may transmit at least one resynchronization message to at least one UE, such as UE 720 in FIG. 7. The at least one resynchronization message may be configured for UE-specific signaling, group-specific signaling, and/or cell-specific signaling. For example, at least one of the modes may be associated with at least one scenario and/or at least one time of day, and/or may be used in different combinations based upon one or more of at least one number of and at least one type of UE, such as UE 410 in FIG. 4. Additionally, if the number of UE associated with the NE is below at least one pre-defined threshold, the at least one resynchronization message may comprise UE-specific signaling. In another example, group-specific signaling may be used for local hotspots, such as cruise ships.

The at least one resynchronization message may be signaled via at least one radio resource control (RRC) signaling channel and/or may comprise at least one random access control parameter. In certain embodiments, the at least one resynchronization message may comprise one or more of one or more of at least one beam switching duration indication (dTs), at least one start time ($t_1$), at least one timing advance, at least one Doppler indicator, at least one three-dimensional angle, and at least one transmission power value. Additionally or alternatively, the at least one resynchronization message may be UE-specific to provide an optimal time distribution of reconnections of the UE to the NE. Furthermore, the at least one resynchronization message may comprise at least one value which is group-specific value and/or cell-specific, both as described below. The at least one resynchronization message may comprise at least one UE-specific value which is a delta value relative to the group-specific and/or cell-specific value.

In various embodiments, the at least one resynchronization message may comprise one or more of at least one common TA value, at least one differential TA value, and at least one absolute TA value, any of which may be associated with $t_2$ of the NE. For example, at least one TA value may be based upon the UE location information, for example, GNSS-based and/or network-based; at least one current TA value associated with the NE; and/or any current or subsequent satellite ephemeris (trajectory) data.

In some embodiments, the at least one resynchronization message may comprise information associated with one or more of at least one common Doppler shift value at $t_2$, at least one differential Doppler shift value at $t_2$; and at least one absolute Doppler shift value at $t_2$ of the NE. For example, such information may be determined based upon one or more of the location of the NE, at least one current TA value, and satellite ephemeris data.

In certain embodiments, the at least one resynchronization message may comprise information of at least one 3D angle of $t_2$ of the NE. For example, such information may comprise location information of the NE and/or satellite ephemeris data. Furthermore, having access to the ephemeris data, the UE may determine this information based upon at least one identifier of the NE. Additionally or alternatively, the at least one resynchronization message may comprise information associated with transmission power of the NE. For example, the transmission power may be directly in case of a regenerative satellite and/or gain factor, transmission power, and/or feeder link loss associated with at least one transparent satellite.

The at least one resynchronization message may be associated with group-casting configured to provide at least one indication of at least one TA value to a group of UEs, including the UE, of at least one cell switch. In certain embodiments, the at least one resynchronization message may comprise one or more of at least one beam switching duration (dTs) indication, at least one start time ($t_1$), at least one timing advance, at least one Doppler indicator, at least one three-dimensional angle, and at least one transmission power value. Additionally or alternatively, the at least one resynchronization message may be UE group-specific configured to indicate at least one delta value relative to the cell-specific value.

In various embodiments, the at least one resynchronization message may comprise information indicating at least one change in the common TA value and/or average TA value for the group; and/or at least one new TA value associated with the group. For example, this information may be configured to enable the UE to have a first estimate, thus, provide faster synchronize to the NE.

In some embodiments, the at least one resynchronization message may comprise information associated with the change in at least one common Doppler shift value and/or at least one average Doppler shift value associated with the group; and/or at least one new Doppler value associated with the group. In certain embodiments, the at least one resynchronization message may comprise information of at least one 3D angle of $t_2$ of the NE. For example, such information may comprise location information of the NE and/or satellite ephemeris data. Furthermore, having access to the ephemeris data, the UE may determine this information based upon at least one identifier of the NE.

Additionally or alternatively, the at least one resynchronization message may comprise information associated with transmission power of the NE. For example, the transmission power may be directly in case of a regenerative satellite and/or gain factor, transmission power, and/or feeder link loss associated with at least one transparent satellite.

In some embodiments, the at least one resynchronization message may be associated with at each UE, including the UE, associated with at least one cell. Such information may reduce signaling overhead.

In various embodiments, the at least one resynchronization message may comprise at least one last frame number to be transmitted before the interruption time and/or the interruption time, allow at least one timer of the UE to modify at least one process in at least one MAC/PHY layer, for example, semi-persistent schedulers and/or feedback.

FIG. 7 illustrates an example of a system according to certain example embodiments. In one example embodiment, a system may include multiple devices, such as, for example, network entity 710 and/or user equipment 720.

Network entity 710 may be one or more of a base station, such as an evolved node B (eNB) or 5G or New Radio node B (gNB), a satellite, such as deployed in a geostationary earth orbit or low earth orbit, a serving gateway, a location management function, a location management component, a server, and/or any other access node or combination thereof.

Furthermore, network entity 710 and/or user equipment 720 may be one or more of a citizens broadband radio service device (CBSD).

Network entity 710 may further comprise at least one gNB-CU, which may be associated with at least one gNB-DU. The at least one gNB-CU and at least one gNB-DU may be in communication via at least one F1 interface, at least one $X_n$-C interface, and/or at least one NG interface via a 5GC.

User equipment 720 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

One or more of these devices may include at least one processor, respectively indicated as 711 and 721. Processors 711 and 721 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 712 and 722. The memory may be fixed or removable. The memory may include computer program instructions or computer code contained therein. Memories 712 and 722 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 711 and 721 and memories 712 and 722 or a subset thereof, may be configured to provide means corresponding to the various blocks of FIGS. 3-6. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 7, transceivers 713 and 723 may be provided, and one or more devices may also include at least one antenna, respectively illustrated as 714 and 724. The device may have many antennas, such as an array of antennas configured for multiple input multiple output (MIMO) communications, or multiple antennas for multiple radio access technologies. Other configurations of these devices, for example, may be provided. Transceivers 713 and 723 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described above (see, for example, FIGS. 3-6). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 3-6. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Partial Glossary

3GPP 3rd Generation Partnership Project
5G 5th Generation
BB Base Band
CQI Channel Quality Indicator
dTs Beam Switching Duration
eMBB Enhanced Mobile Broadband
eNB Evolved Node B
EPC Evolved Packet Core
GEO Geostationary Earth Orbit
gNB New Radio Node B
GPS Global Positioning System
LEO Low Earth Orbit
LTE Long-Term Evolution
MAC Medium Access Control
NE Network Entity
NG-eNB Next Generation Evolved Node-B
NTN Non-Terrestrial Networks
NR New Radio
PCI Physical Cell Identifier PHY Physical Layer
RAN Radio Access Network
REL Release
RF Radio Frequency
RLF Radio Link Failure
RRC Radio Resource Control
TA Timing Advance
TR Technical Report
UE User Equipment
UL Uplink
URLLC Ultra-Reliable and Low-Latency Communication

We claim:

1. A method, comprising:
receiving, by a user equipment (UE), at least one resynchronization message from at least one first network entity (NE), wherein the at least one resynchronization message comprises one or more of at least one timing advance value and at least one three-dimensional angle; and
resynchronizing, by the UE, with at least one second NE after at least one time period with at least one parameter based upon the at least one resynchronization message, wherein the at least one second NE is separate from the at least one first NE..

2. The method of claim 1, wherein the at least one resynchronization message is received via at least one radio resource control signaling channel and/or comprises at least one random access control parameter.

3. The method of claim 1, wherein the at least one resynchronization message further comprises one or more of at least one beam switching duration indication, at least one start time, and at least one transmission power value.

4. The method of claim 1, wherein the at least one resynchronization message is UE-specific.

5. The method of claim 1, wherein the at least one resynchronization message comprises at least one UE-specific value.

6. The method of claim 1, wherein the at least one resynchronization message comprises at least one value which is UE group-specific and/or cell-specific.

7. The method of claim 1, wherein the at least one resynchronization message comprises at least one UE-specific value which is a delta value relative to a group-specific and/or cell-specific value.

8. The method of claim 1, wherein the at least one resynchronization message comprises one or more of at least one common timing advance value, at least one differential timing advance value, and at least one absolute timing advance value.

9. The method of claim 1, wherein the at least one resynchronization message is associated with UE groupcasting configured to provide at least one indication of at least one timing advance value to a group of UEs.

10. The method of claim 9, wherein the at least one resynchronization message comprises information indicating at least one change in a common timing advance value and/or average timing advance value for the group of UEs.

11. A method, comprising:
transmitting, by a first network entity (NE), at least one resynchronization message to at least one user equipment (UE), wherein the at least one resynchronization message comprises one or more of at least one timing advance value and at least one three-dimensional angle, and the at least one resynchronization message is configured for the UE to resynchronize with a second NE after at least one time period with at least one parameter based upon the at least one resynchronization message, wherein the at least one second NE is separate from the at least one first NE.

12. The method of claim 11, wherein the at least one resynchronization message is received via at least one radio resource control signaling channel and/or comprises at least one random access control parameter.

13. The method of claim 11, wherein the at least one resynchronization message further comprises one or more of at least one beam switching duration indication, at least one start time, and at least one transmission power value.

14. The method of claim 11, wherein the at least one resynchronization message is UE-specific.

15. The method of claim 11, wherein the at least one resynchronization message comprises at least one UE-specific value.

16. The method of claim 11, wherein the at least one resynchronization message comprises at least one value which is UE group-specific and/or cell-specific.

17. The method of claim 11, wherein the at least one resynchronization message comprises at least one UE-specific value which is a delta value relative to a group-specific and/or cell-specific value.

18. The method of claim 11, wherein the at least one resynchronization message comprises one or more of at least one common timing advance value, at least one differential timing advance value, and at least one absolute timing advance value.

19. The method of claim 11, wherein the at least one resynchronization message is associated with UE groupcasting configured to provide at least one indication of at least one timing advance value to a group of UEs.

20. The method of claim 19, wherein the at least one resynchronization message comprises information indicating at least one change in a common timing advance value and/or average timing advance value for the group of UEs.

* * * * *